United States Patent [19]

Koyama

[11] Patent Number: 4,974,715
[45] Date of Patent: Dec. 4, 1990

[54] OIL PASSAGES OF TORQUE CONVERTER
[75] Inventor: Takao Koyama, Atsugi, Japan
[73] Assignee: Nissan Motor Co., Ltd., Yokohama, Japan
[21] Appl. No.: 415,106
[22] Filed: Oct. 2, 1989
[30] Foreign Application Priority Data Oct. 5, 1988 [JP] Japan .................... 63-249795

[51] Int. Cl.$^5$ ............................. F16H 45/02
[52] U.S. Cl. .................... 192/3.29; 192/3.3
[58] Field of Search ............ 192/3.21, 3.28, 3.29, 192/3.3, 3.33

[56]  References Cited
U.S. PATENT DOCUMENTS

| | | | |
|---|---|---|---|
| 2,995,956 | 8/1961 | Moore | 192/3.3 X |
| 3,189,144 | 6/1965 | Gabriel | 192/3.29 |
| 4,299,315 | 11/1981 | Ohtsaka | 192/3.3 |
| 4,382,496 | 5/1983 | Yamamori et al. | 192/3.29 |
| 4,406,355 | 9/1983 | Bionaz | 192/3.3 |
| 4,716,998 | 1/1988 | Tsukamoto et al. | 192/3.3 |

Primary Examiner—Richard Lorence
Attorney, Agent, or Firm—Foley & Lardner, Schwartz, Jeffery, Schwaab, Mack, Blumenthal & Evans

[57]  ABSTRACT

A lockup torque converter has a turbine splined to a turbine shaft, and a stator mounted on a stator shaft. Axial hole, radial hole and annular groove of the turbine shaft, and a first radial hole of the stator shaft form a first fluid passage for connecting a first fluid chamber on one side of a lockup clutch piston, with a pressure control unit whereas a second fluid passage for a second fluid chamber on the other side of the lockup clutch piston is formed by an outer annular clearance around the stator shaft inside a hub of an impeller. In order to prevent fluid leakage, the stator shaft is further formed with a second radial hole extending from the outer annular clearance to an inner annular clearance which is formed around the turbine shaft inside the stator shaft, and which is bounded between a bushing for supporting the turbine shaft and a sealing ring.

6 Claims, 2 Drawing Sheets

OIL PASSAGES OF TORQUE CONVERTER

BACKGROUND OF THE INVENTION

The present invention relates to a torque converter generally used for a motor vehicle, and more specifically to an oil passage system of a lockup torque converter.

FIG. 2 shows a conventional torque converter (as disclosed in Japanese Utility Model Provisional Publication No. 62-162448. The torque converter 10 shown in FIG. 2 includes a pump impeller 12, a turbine runner 14, a stator 16, a lockup clutch piston 18, a cover shell 20, nuts 22, a stator shaft 24, a one-way clutch 26, a hub 28, a turbine shaft (transmission input shaft) 30, a sealing ring 32, springs 34, a clutch facing 36, a release chamber 40, an apply chamber 42, an axial center hole 44, a converter sleeve 45, and a bushing 46. The lockup torque converter 10 functions as a hydrodynamic drive when the oil is supplied to the release chamber 40, and the oil flows therefrom to the apply chamber 42. The lockup clutch piston 18 is engaged to provide a direct mechanical drive when the oil pressure is supplied to the apply chamber 42, and the release chamber 40 is drained.

In the engaged state, however, the fluid pressure in the apply chamber 42 is liable to decrease because of leakage of the oil, and to cause slippage of the lockup clutch piston 18. The oil pressure is supplied to the apply chamber 42 through an annular passage 47 between the converter sleeve 45 and the stator shaft 24 while the release chamber 40 is drained through the axial hole 44 of the turbine shaft 30. In this case, a clearance 48 between the stator shaft 24 and the turbine shaft 30 is put in the drain state because the clearance 48 is in communication with the axial hole 44. Therefore, one side of the bushing 46 receives the oil pressure in the apply chamber 42 whereas the other side is held in the drain state. The thus-developed pressure difference across the bushing 46 incurs leakage of the oil through the clearance between the bushing 46 and the turbine shaft 30, which results in a decrease of the oil pressure in the apply chamber 42, and a decrease of the force pressing the lockup clutch piston 18 against the cover shell 20.

SUMMARY OF THE INVENTION

It is an object of the present invention to provide a lockup torque converter having a fluid passage system which is more tight against fluid leakage.

According to the present invention, a torque converter comprises a pump impeller (input member), a turbine runner (output member), a stator member (reaction member) having a one-way clutch, a lockup clutch piston, a turbine shaft to which the turbine runner is splined, and a stator shaft on which the one-way clutch of the stator member is mounted. The pump impeller is fixed to a cover shell so that a converter chamber (hydrodynamic drive chamber) is formed between the pump impeller and the cover shell. The pump impeller has a hub portion. The lockup clutch piston divides the converter fluid chamber into a first fluid chamber (release chamber) and a second fluid chamber (apply chamber).

The turbine shaft has an axial hole, an annular groove and a radial hole. The axial hole is in fluid communication with the first fluid chamber. The annular groove is formed in an outside surface of the turbine shaft, and located between first and second sealing rings which are mounted on the turbine shaft. The radial hole of the turbine shaft extends from the axial hole to the annular groove so as to form a continuous fluid passage. The turbine shaft is supported by supporting means which comprises a bushing.

The stator shaft has an axial bore in which the turbine shaft is supported by the bushing. The stator shaft is inside the hub portion of the pump impeller, and an outer annular clearance is formed around the stator shaft inside the hub portion of the pump impeller. The outer annular clearance is in fluid communication with the second fluid chamber. The stator shaft has first and second radial holes. The first radial hole communicates with the annular groove of the turbine shaft. The second radial hole extends from the outer annular clearance to an inner annular clearance which is formed between the stator shaft and the turbine shaft, and which is bounded between the bushing and the first sealing ring lying between the inner annular clearance and the annular groove.

In this torque converter, the second radial hole formed in the stator shaft makes the fluid pressure on one side of the bushing equal to the fluid pressure on the other side, and promotes lubrication of the bushing. On the other hand, the first and second sealing rings on both sides of the annular groove of the turbine shaft reliably prevent fluid leakage between the first fluid passage for conveying the fluid into and out of the first fluid chamber, and the second fluid passage for conveying the fluid into and out of the second chamber. Thus, the lockup torque converter can eliminate undesired slippage of the lockup clutch piston, and ensure the lubrication of the bushing.

DETAILED DESCRIPTION OF THE INVENTION

Figure 1:
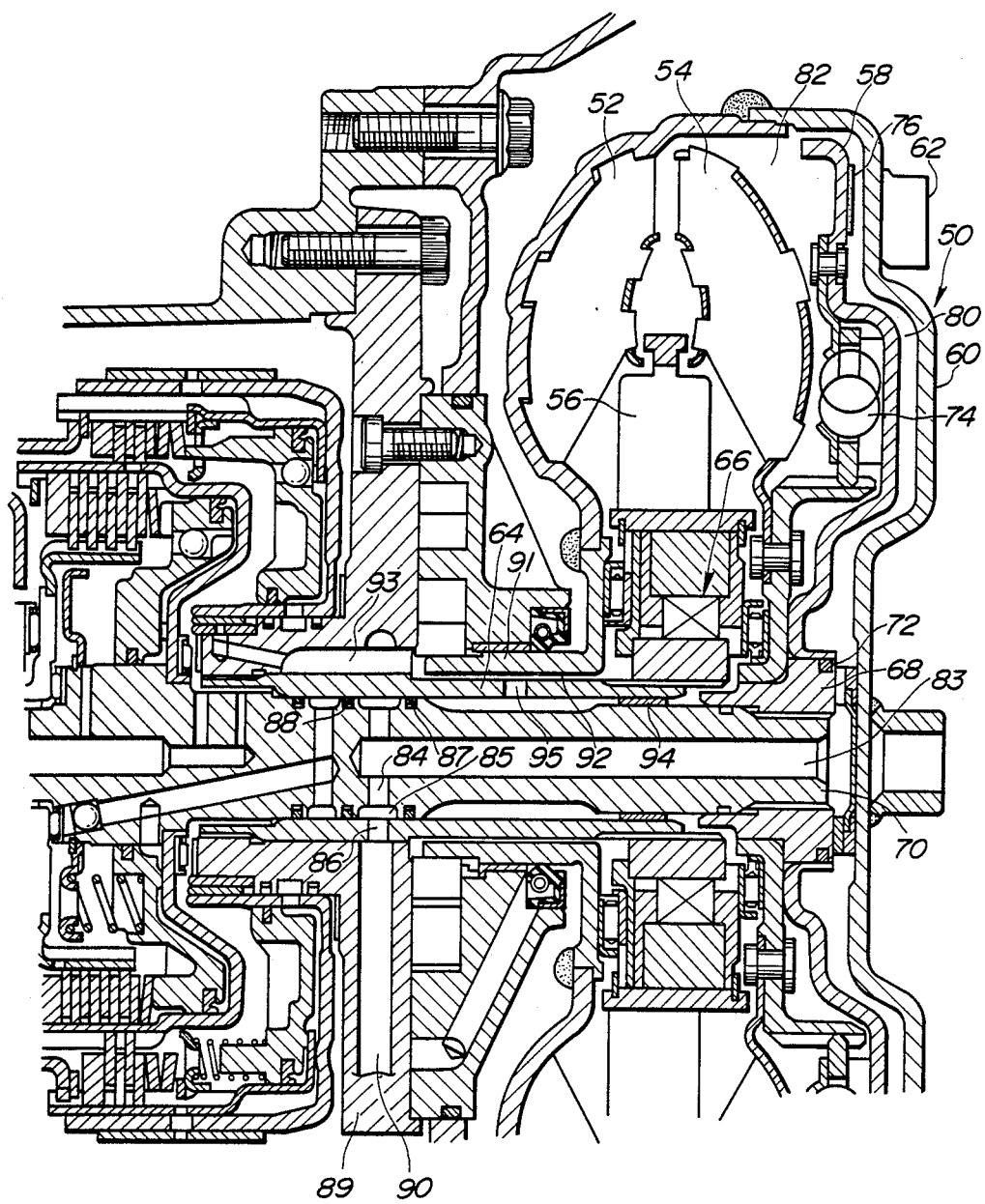
FIG. 1 is a sectional view showing a lockup torque converter according to the present invention.
Figure 2:
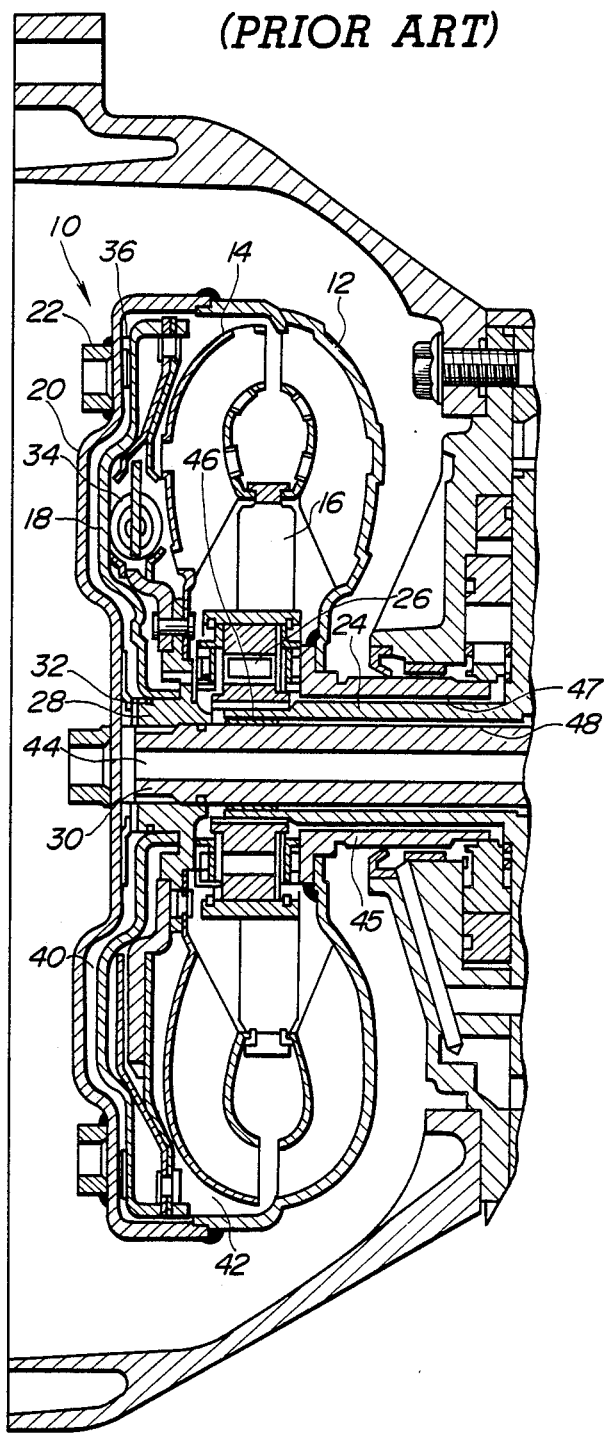
FIG. 2 is a sectional view showing a conventional lockup torque converter.

FIG. 1 shows one embodiment of the present invention.

As shown in FIG. 1, a lockup torque converter 50 of this embodiment includes a pump impeller (power input member) 52, a turbine runner (output member) 54, a stator (reaction member) 56, and a lockup clutch piston 58 which mechanically couples the pump impeller 52 and the turbine runner 54.

The pump impeller 52 is welded to a cover shell 60, and a converter fluid chamber (hydrodynamic drive chamber), is, formed therebetween. Nuts 62 are welded to an outer surface of the cover shell 60. The cover shell 60 is connected with a crankshaft of an engine via the nuts 62 and a drive plate (not shown).

The stator 56 is mounted on a stator shaft 64 via a one-way clutch 66. A hub 68 of the turbine runner 54 is splined to a turbine shaft (transmission input shaft) 70, so that the turbine runner 54 rotates together with the turbine shaft 70.

The lockup clutch piston 58 is disposed between the turbine runner 54 and the cover shell 60. The lockup clutch piston 58 has a radial inner portion which is axially slidably mounted on the turbine hub 68. A seal member 72 is provided between the turbine hub 68 and the inner portion of the lockup clutch piston 58 to form a leakproof seal therebetween. The lockup clutch piston 58 and the turbine hub 68 are connected through damper springs 74. The lockup clutch piston 58 has a clutch facing 76 which is fixed to an outer peripheral portion of the lockup clutch piston 58 and which confronts the cover shell 60. The lockup clutch piston 58 divides the converter fluid chamber into first and second fluid chambers, i.e., a release chamber 80 and an apply chamber 82. The release chamber 80 is between the lockup clutch piston 58 and the cover shell 60, and the apply chamber 82 is on the opposite side of the clutch piston 58.

The turbine shaft 70 has an axial center hole 83, a radial hole 84 and an annular groove 85, which serve together as a fluid passage connecting the release chamber 80 to a fluid pressure control device (not shown). The axial center hole 83 is in fluid communication with the release chamber 80. The annular groove 85 is formed in the outside cylindrical surface of the turbine shaft 70. The radial hole 84 extends radially inwardly from the annular groove 85 to an innermost end of the axial hole 83. First and second seal rings 87 and 88 are mounted on the turbine shaft 70. The annular groove 85 is located between the first and second seal rings 87 and 88. Each of the seal rings 87 and 88 is received in a ring groove formed in the outer cylindrical surface of the turbine shaft 70.

The stator shaft 64 has a bore in which the turbine shaft 70 is rotatably fitted. The stator shaft 64 has a first radial hole 86 opening into the annular groove 85 of the turbine shaft 70. The stator shaft 64 is fitted in an oil pump cover 89, and the radial hole 86 of the stator shaft 64 is in communication with an oil passage 90 formed in the oil pump cover 89. In this way, the release chamber 80 is fluidly connected with the fluid pressure control device by the hollow portions 83, 84, 85, 86, and 90 which form a continuous first fluid passage.

On the other hand, the apply chamber 82 is connected with an oil passage 93 formed in the oil pump cover 89, through an outer annular clearance 92 formed between the stator shaft 64 and a converter sleeve 91. The converter sleeve 91 is welded to the pump impeller 52 so as to form a hub portion of the pump impeller 52, and mounted on the stator shaft 64. The outer annular clearance 92 is formed between the outside cylindrical surface of the stator shaft 64 and the inside cylindrical surface of the converter sleeve 91. The oil passage 93 is connected with the fluid pressure control device. The hollow portions 92 and 93 form a second fluid passage for the apply chamber 82.

The turbine shaft 70 is supported by bushings including a bushing 94. The bushing 94 is provided in the bore of the stator shaft 64, near the first end of the stator shaft 64 confronting the turbine hub 68. The stator shaft 64 further has a second radial hole 95 extending radially from the outside cylindrical surface to the inside cylindrical surface. The second radial hole 95 is located axially between the bushing 94, and the first sealing ring 87 which is closer to the bushing 94 than the second sealing ring 88. The second radial hole 95 opens into an inner annular clearance which is formed radially between the stator shaft 64 and the turbine shaft 70, and which is axially bounded between the bushing 94 and the first sealing ring 87. As shown in FIG. 1, the turbine shaft 70 of this embodiment is formed with another annular groove between the bushing 94 and the first sealing ring 87. This annular groove has an axial width greater than the annular groove 85. The second radial hole 95 opens into this annular groove. This annular groove is blind, and separated from the axial hole 83.

The lockup torque converter 50 is operated as follows:

When the lockup mechanism is inoperative, the operating oil is supplied from the release chamber 80 to the apply chamber 82. From the fluid pressure control device, the oil pressure is supplied to the release chamber 80 through the oil passage 90, the radial hole 86, the annular groove 85, the radial hole 84 and the axial center hole 83. From the release chamber 80, the operating oil further flows through the clearance between the cover shell 60 and the clutch facing 76, into the apply chamber 82, and goes out from the apply chamber 82 through the outer annular clearance 92 and the oil passage 93. A portion of the oil flows through a narrow clearance between the bushing 94 and the turbine shaft 70, and further flows through the second radial hole 95 into the annular passage 92. The bushing 94 is lubricated by this oil flow.

The lockup mechanism is engaged by supplying the oil pressure to the apply chamber 82 and draining the release chamber 80. The pressure control device is switched to a different state to supply the oil pressure to the oil passage 93 and drain the oil passage 90. The oil pressure in the passage 93 is introduced into the apply chamber 82 through the outer annular clearance 92. Therefore, the lockup clutch piston 18 is pressed against the cover shell 60, and brought to an engaged state in which the lockup clutch piston 18 and the cover shell 60 rotate together as a unit. In the engaged state, the clutch facing 76 is in intimate contact with the cover shell 60, and therefore, the apply chamber 82 is shut off from the release chamber 80. The release chamber 80 is drained through the axial hole 83, the radial hole 84, the annular groove 85, the radial hole 86 and the oil passage 90. The first sealing ring 87 prevents undesired decrease of the oil pressure in the apply chamber 82 by preventing leakage of the oil from the second radial hole 95 into the annular groove 85 which is in the drain state. Therefore, the engagement force of the lockup clutch piston 18 is held satisfactorily high. The oil pressure in the apply chamber 82 is applied on both sides of the bushing 94, so that the bushing 94 is lubricated sufficiently.

What is claimed is:

1. A torque converter comprising:
   a pump impeller fixed to a cover shell to form a converter fluid chamber, said pump impeller including a hub portion,
   a turbine runner,
   a stator member including a one-way clutch,
   a lockup clutch piston dividing said converter chamber into first and second fluid chambers,
   a turbine shaft to which said turbine runner is splined, said turbine shaft including an axial hole which is in fluid communication with said first fluid chamber, an annular groove formed in an outside surface of said turbine shaft between first and second sealing rings mounted on said turbine shaft, and a radial hole connecting said axial hole to said annular groove, said turbine shaft being supported by means comprising a bushing, and
   a stator shaft on which said one-way clutch of said stator member is mounted, said stator shaft including an axial bore in which said turbine shaft being supported by said bushing, said stator shaft being inside said hub portion of said pump impeller, an outer annular clearance being formed around said stator shaft inside said hub portion of said pump impeller, said outer annular clearance being in fluid communication with said second chamber, said stator shaft comprising a first radial hole communicating with said annular groove of said turbine shaft, and a second radial hole extending from said outer annular clearance to an inner annular clearance which is formed between said stator shaft and said turbine shaft and bounded between said bushing, and said first sealing ring lying between said inner annular clearance and said annular groove.

2. A torque converter according to claim 1, wherein said lockup clutch piston being disposed between said turbine runner and said cover shell for providing a direct mechanical drive by coupling said cover shell with said turbine shaft, and said first fluid chamber being located between said cover shell and said lockup clutch.

3. A torque converter according to claim 2, wherein said turbine runner comprises a hub portion mounted on said turbine shaft near one end of said stator shaft, and said busing being on one side exposed to a fluid pressure in said inner annular clearance which is in fluid communication with said second fluid chamber through said second radial hole of said stator shaft and said outer annular clearance, and being on an opposite side exposed to a fluid pressure in an annular space which is in fluid communication with said second fluid chamber through a gap between said stator shaft and said hub portion of said turbine runner.

4. A torque converter according to claim 3 wherein said turbine shaft comprises a blind groove which is formed in said outside surface of said turbine shaft within said inner annular clearance between said first sealing ring and said bushing, and which is separated from said axial hole of said turbine shaft by a wall of said turbine shaft so that said inner annular clearance is out of fluid communication with said axial hole, said second radial hole of said stator shaft opening into said blind groove.

5. A torque converter according to claim 4, wherein said busing comprises an outer circumferential surface in contact with said stator shaft, and an inner circumferential surface in contact with said turbine shaft.

6. A torque converter according to claim 1, wherein said torque converter further comprises a fluid pressure control means for draining fluid through said radial hole of said turbine shaft, and simultaneously supplying a fluid pressure through said outer annular clearance to put said lockup clutch in a lockup state, and for supplying the fluid pressure through the radial hole of the turbine shaft and simultaneously draining the fluid through the outer annular clearance to put said lockup clutch in a disengaged state.

* * * * *